J. M. LOWREY.
TRAP.
APPLICATION FILED MAY 9, 1914.

1,126,801.

Patented Feb. 2, 1915.
2 SHEETS—SHEET 1.

WITNESSES:
A R Houston
nomie Nelah.

INVENTOR
John M Lowrey
BY
[signature]
ATTORNEY

J. M. LOWREY.
TRAP.
APPLICATION FILED MAY 9, 1914.
1,126,801.
Patented Feb. 2, 1915.
2 SHEETS—SHEET 2.
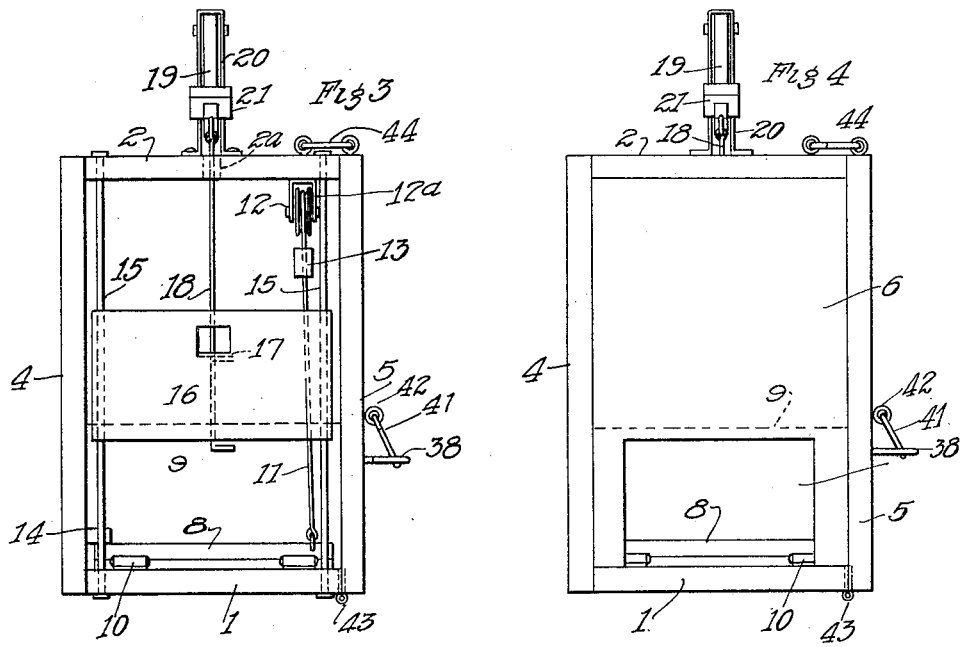
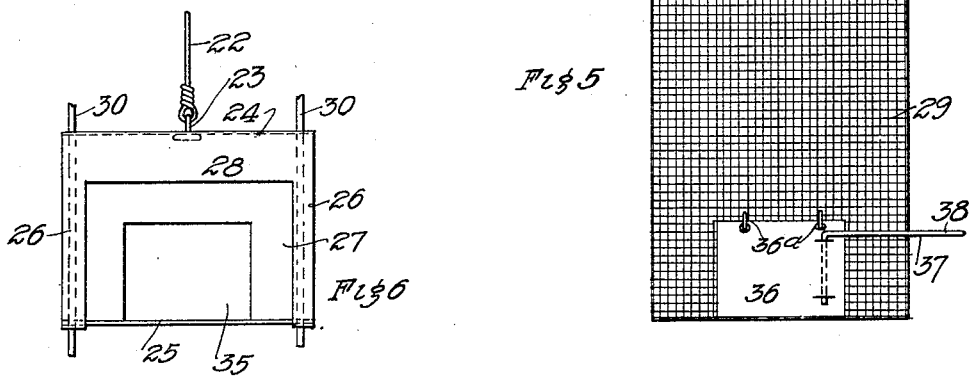
WITNESSES:
INVENTOR
JOHN M LOWREY.
BY
ATTORNEY

UNITED STATES PATENT OFFICE.

JOHN M. LOWREY, OF BIRMINGHAM, ALABAMA.

TRAP.

1,126,801. Specification of Letters Patent. Patented Feb. 2, 1915.

Application filed May 9, 1914. Serial No. 837,526.

*To all whom it may concern:*

Be it known that I, JOHN M. LOWREY, a citizen of the United States of America, residing at Birmingham, in the county of Jefferson and State of Alabama, have invented certain new and useful Improvements in Traps, of which the following is a specification.

My invention relates to a trap for catching rats and like animals and my object is to provide a trap which will automatically reset itself, utilizing the weight of the quarry for this purpose, preferably by the provision of a counterbalanced cage which will descend under the quarry's weight and in its lowered position will deliver the quarry to a separate compartment.

A further object of my invention is to design the movable cage so that it serves as a closure between the two compartments of the trap, preventing at all times direct access from one to the other while being itself accessible to one compartment in one position and to the other in its other position.

A further object of my invention is to simplify and perfect the means for automatically resetting the trap door by means of the cage when the latter moves to transfer the quarry to the storage compartment of the trap.

My invention further comprises the details of construction and arrangements of parts which in their preferred embodiment only are hereinafter more particularly described and claimed, reference being had to the accompanying drawings which form a part of this specification, and in which:—

Figure 1:
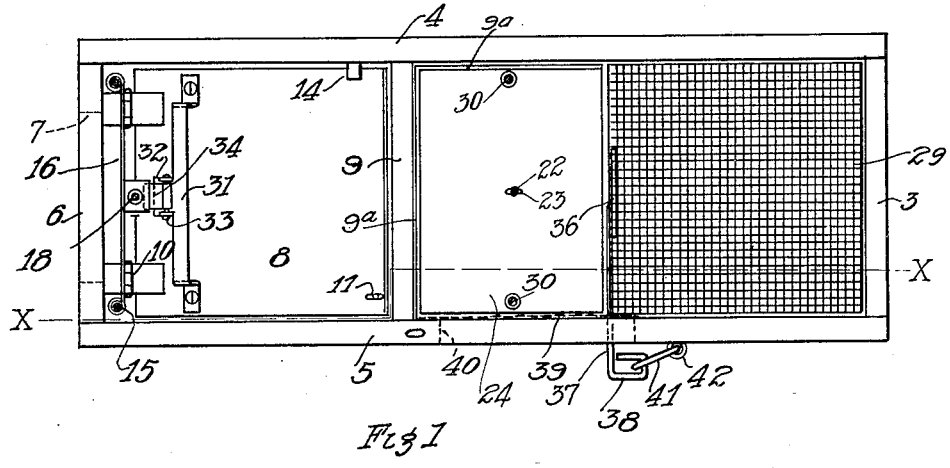
Figure 2:
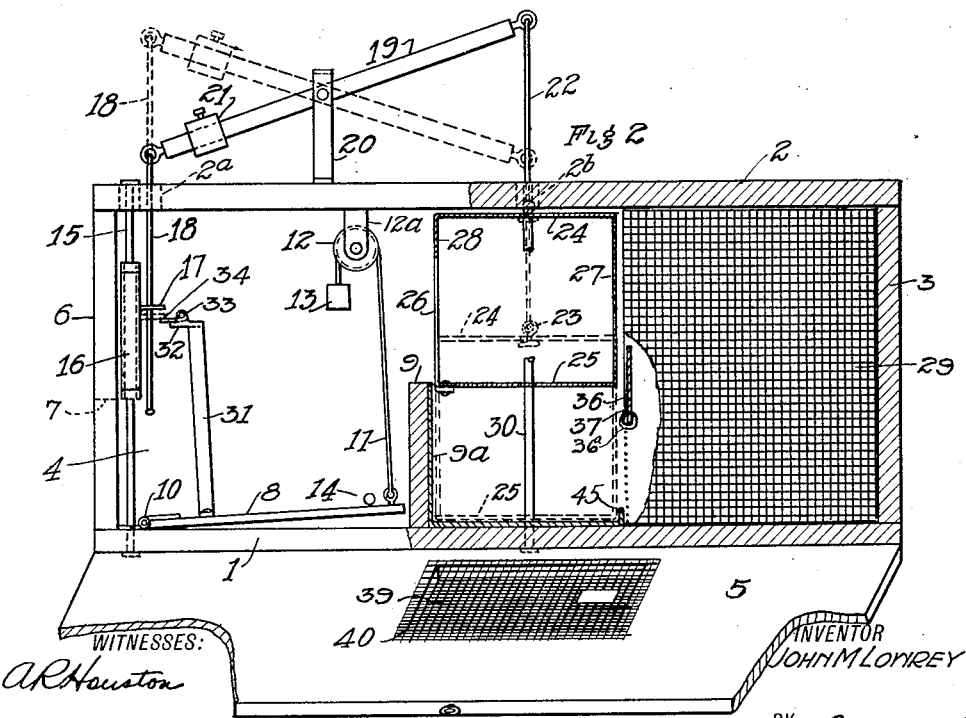

Figure 1 is a plan view of the trap with the top cover removed. Fig. 2 is a side elevation of the trap with its side door open and swung down sufficiently to show its inner side. Fig. 3 is a front view of the trap with the front wall removed. Fig. 4 is a front elevation of the trap. Fig. 5 is a detail view of the storage compartment showing its door closed. Fig. 6 is a front elevation of the movable cage.

Similar reference numerals refer to similar parts throughout the drawings.

The trap may be made of any suitable material and comprises a bottom 1, top 2, rear wall 3, side wall 4, a side door 5 forming the other side wall, and a front wall 6. The trap is preferably oblong in shape and in its front wall 6 I provide a door 7 through which the quarry enters. A false bottom 8 is provided in the front compartment of the trap which I term that portion thereof between wall 6 and a vertical transverse partition 9 which rises about four inches above the bottom of the trap and extends from side to side of the trap. The false bottom is hinged at 10 adjacent to wall 6 and its free end extends nearly to partition 9 where it has connected to it at one side a cord 11 which passes upwardly over a pulley 12 and is then connected to a counterweight 13 which overbalances the weight of the false bottom just enough to normally hold it up against stop 14 connected to the side wall 4. The pulley 12 is journaled in a hanger 12ª connected to the top 2. At each side of the front compartment adjacent to wall 6 I provide vertical guide pins 15 which pass through the bottom and top walls 1 and 2 and are made fast thereto in any suitable manner. Upon these pins is slidingly mounted a metal door 16, its end edges being bent around to form guides 16ª which loosely encircle the pins 15. An inturned lip 17 is punched out of the upper end of door 16 and has an opening therein through which a wire 18 passes freely and extends up through an elongated opening 2ª in the top of the trap and connects to one end of a rocking lever 19. This lever is journaled at its center in a bent metal bracket 20 secured to the top 2 and at its other end it is connected by a wire 22 to an eye 23 which is riveted or fastened to the top 24 of a vertically movable cage within the trap. The wire 22 passes through an elongated slot 2ᵇ.

The cage is formed preferably by a strip of sheet metal which is bent to form a horizontal bottom 25, vertical rear wall 27 and a horizontal top 24 which has its forward edge 28 downturned and adapted, when the cage is lowered, to fall below the top partition 9. The flange 28 has vertical strips 26 which are attached to the bottom to brace the cage, which is adapted to rise and fall freely between the partition 9 and storage compartment 29 for the entrapped animals, but without engaging either, for which purpose it is guided by pins 30 connected to the top and bottom of the trap on each side and serving to hold the cage spaced from the walls 4 and 5 and from the partition 9 and compartment 29. The lever 19 carries an adjustable weight 21 thereon by means of which the cage can be overbalanced just sufficiently to be held raised in its full line position, Fig. 2, in which position the wire 18 is lowered to dotted position, Fig. 2, and the door 16 is free to drop when released by its trip mechanism. This trip mechanism comprises a U-shaped metal strap 31 having its angled bottom ends attached to the false bottom 8. At the center of its top member it is provided with a forward extending lug 32 having at its sides upturned ears in which is mounted a pin 33 to which the catch 34 is hinged, so that it is free to swing upwardly but is arrested in horizontal position by the lug 32. The stop 14 brings the counterweighted false bottom to rest with catch 34 disposed slightly in the path of the door lug 17 so that the door is held thereby in elevated position until the weight of the quarry depresses the false bottom 8 and swings the catch 34 inwardly to release the door which falls by its own weight. As soon as the weight of the quarry is off the bottom 8 the latter's counter-weight moves catch 34 again into position in the path of lug 17, but as the door is lifted the lug will ride past the hinged catch which will drop back into position to reëngage lug 17 and hold the door set.

When the quarry has entered the trap and tripped the door 16 behind him, it will sooner or later jump over partition 9 and onto the movable cage where its weight will counterbalance the weight 21 so that the cage will drop with the quarry to its lowered or dotted line position, Fig. 2, and in doing so will rock the lever 19 to again raise the door by means of the wire 18 and reset it. While the quarry is held in the cage it is prevented by the partition 9 from gaining access again to the front part of the trap. All parts of the trap exposed below the cage when raised are lined with metal 9ª. The rear wall 27 of the cage is provided with a door 35 which in its lowered position comes opposite to an opening in the front wall of the receiving compartment 29. This compartment, which is preferably made of strong hardware cloth, has an inner metal door 36 hinged by wire loops 36ª and slotted to receive the angled end of a crank arm 37 which has at its outer end a loop 38. This loop is passed through an opening 38ª provided therefor in the hardware cloth 39 which forms the covering for the inner wall of the door 5 opposite the space below the cage when raised. An opening 40 in door 5 is covered by cloth 39 and permits one to see into the space between partition 9 and the storage compartment 29. By means of the crank arm 37 the door 36 can be swung upwardly on its hinges to open the storage compartment door and is adapted to be held in this position by having its looped end 38 engaged by a hook 41 connected by a screw eye 42 to door 5. When the cage descends the door 35 in the rear wall thereof, coming into register with the open door in the storage compartment, permits the quarry to pass into the latter and as soon as this occurs the cage is immediately returned to its full line position by its counterweight. When it is desired to empty the trap the operator looks through the opening 40 to see if the quarry by chance is below the cage, in which case it is caused to pass into the storage compartment after which the door 36 is closed and the side door 5 swung downwardly on its hinges 43, when the storage compartment 29 is free to be removed from the trap and the quarry disposed of in any desired manner.

It being essential for the cage to move with a minimum of friction so that it can be delicately counterbalanced, I punch alining holes in its top and bottom walls near the sides and pass therethrough vertical guide pins 30 made fast in the top and bottom walls of the trap. These guide pins are so disposed that they hold the cage from engagement with any part of the trap as it rises or falls.

I regard as the essential feature of my invention the subdivision of the trap into two compartments which are separated by the movable cage which in its raised position is open to the entering compartment and in its lowered position to its storage compartment of the quarry and which in its descent automatically resets the trap.

It will be understood that bait is placed on or over the false bottom 8 in such manner as to attract the attention of the quarry and induce it to enter the trap.

Without further limiting myself to the details of construction which I have described as the preferred embodiment of my invention, what I claim as new and desire to secure by Letters Patent, is:—

1. The combination with a trap having quarry controlled means to close the trap, of an elevator therein, counterbalancing means to hold the elevator elevated until it supports the weight of the trapped quarry, a shaft for the elevator, the elevator when raised being open to the trap, and a storage compartment open to the lower end of said shaft and to the elevator when lowered and shut off at all times by said elevator from direct access to the trap, substantially as described.

2. The combination with a trap, of an elevator, counterbalancing means to hold the elevator elevated until it supports the weight of the quarry, a shaft for the elevator, the elevator when raised being open to the trap, a storage compartment open to the lower end of said shaft and to the elevator when lowered and shut off at all times by said elevator from direct access to the trap, and means operated by the descent of said elevator to reset the trap, substantially as described.

3. A trap comprising a receiving compartment, a storage compartment, a partition in the receiving compartment, said storage compartment having an opening therein below the top level of said partition, a vertically movable cage mounted in the trap and having side openings, one opening being exposed to the receiving compartment above the partition when the cage is raised and being closed by the partition when the cage is lowered, and the other opening in the cage being adapted to register with the opening in the storage compartment when the cage is in its lowered position, and counterbalancing means to support the cage normally in elevated position, substantially as described.

4. A trap comprising a receiving compartment, a storage compartment, a partition in the receiving compartment, said storage compartment having an opening therein below the top level of said partition, a movable cage having front and rear openings, the front opening being exposed to the receiving compartment above the partition when the cage is raised and being closed by the partition when the cage is lowered, and the rear door in the cage being adapted to register with the opening in the storage compartment when the cage is in its lowered position, counterbalancing means to support the cage normally in elevated position, a door for the receiving compartment, quarry actuated means for closing the door, and means actuated by the descending cage for resetting the door in open position.

5. In a trap, a box having an admission opening at one end, a storage compartment therein having an opening, a vertically movable cage in the trap, a partition coöperating with said cage to prevent direct access from the trap to said opening in the storage compartment, a door for closing the entrance to the trap, an operating connection between said door and cage for raising said door, means to hold the cage normally elevated whereby the entering quarry can have access thereto and cause the cage to descend and reset the trap door, said cage when lowered having access to said storage compartment opening, and latch means to hold the trap door elevated, substantially as described.

6. In a trap, a box having an entrance opening, a door to close the same, a catch to hold the door open, means actuated by the weight of the quarry to trip the catch, a cage vertically movable in the trap and having side openings, a counterbalanced lever connected to the cage at one end and having an operating connection to the door at the other end for raising said door, a storage compartment in the rear of said cage and having an opening therein with which an opening in the cage in its lowered position registers, a partition co-acting with said cage to prevent direct access from the trap to said compartment door or vice versa, said cage, when above said partition, being adapted to permit the quarry to enter therein and lower itself into position to enter said storage compartment, said connections from the cage to the trap door permitting the latter to drop by gravity when the cage is in elevated position, substantially as described.

7. In a trap having an entrance opening, a gravity drop door for closing said opening, a false bottom in the front end of the trap, counterbalancing means to hold said bottom normally elevated, a catch to hold the door raised which is tripped by said false bottom when lowered, a counterbalanced lever above the door, an operating connection between the lever and door for raising said door, a cage suspended from said lever, a partition dividing off from the front end of the trap the compartment into which said cage descends, a rear compartment having an opening which establishes access between it and the cage when the latter is lowered, said compartment being shut off from the front end of the trap by said partition and cage, and the descent of the cage acting through the lever and connections to raise and reset the door, substantially as described.

8. In a trap, an oblong box having in the rear a metallic storage compartment with an opening at its lower forward end, a normally open door for closing said opening, a partition spaced from said opening, and a cage which in conjunction with said partition serves to prevent direct access from said opening to the front part of the trap, said cage having a side opening which in its lowered position establishes communication between it and said storage compartment, a vertically movable door giving access to the front of the trap, a false bottom extending approximately to the partition, a pivoted catch means controlled by the depression of the false bottom and adapted to release the trap door from its open position, means to raise the door past said catch and reset it automatically, said means comprising a pivoted lever loosely connected at one end with connection to the door and connected at its other end to said cage, said loose connection permitting the door to drop freely into operating engagement with said connection while the cage stands elevated, and counterbalance means to hold said cage in its elevated position with an opening thereof above said partition and accessible from the front of the trap, substantially as described.

9. In a trap, a receiving compartment, a storage compartment, a trap door for the receiving compartment, means actuated by the quarry to close said door behind it, a movable transfer means accessible to the trapped quarry in the receiving compartment and movable under the weight of the quarry to deliver it to the storage compartment, and means responsive to the movement of said transfer means to reset the trap door.

10. A trap having a receiving compartment with a floor level entrance, a trap door for said entrance, a vertically movable cage disposed within the trap at the side thereof opposite said door, quarry controlled means to trip the trap door, a counterbalance means to normally hold the cage elevated, a storage compartment, means to prevent direct access between said compartments which include said cage, said storage compartment and cage having openings which register only when the cage stands in its lowered position, and means controlled by the descent of the cage to reset the trap door in open position.

In testimony whereof I affix my signature in presence of two witnesses.

JOHN M. LOWREY.

Witnesses:
NOMIE WELSH,
R. D. JOHNSTON, Jr.